United States Patent [19]

Deyoe et al.

[11] 4,232,046

[45] Nov. 4, 1980

[54] LIQUID STARCH-UREA RUMINANT FEED AND METHOD OF PREPARING SAME

[75] Inventors: Charles W. Deyoe; Erle E. Bartley, both of Manhattan, Kans.

[73] Assignee: Kansas State University Research Foundation, Manhattan, Kans.

[21] Appl. No.: 951,617

[22] Filed: Oct. 16, 1978

[51] Int. Cl.$^3$ .............................................. A23K 1/22
[52] U.S. Cl. ..................................... 426/69; 426/623; 426/630; 426/635; 426/807
[58] Field of Search ................. 426/69, 630, 635, 623, 426/658, 807

[56] References Cited

U.S. PATENT DOCUMENTS

| | | | |
|---|---|---|---|
| 3,642,489 | 2/1972 | Bartley et al. | 426/69 |
| 3,653,909 | 4/1972 | Wilson | 426/69 |
| 3,684,518 | 8/1972 | Wortham | 426/658 |
| 3,988,483 | 10/1976 | Deyoe et al. | 426/69 X |
| 4,167,584 | 9/1979 | Nelson | 426/53 X |

OTHER PUBLICATIONS

Behnke et al., Results from Examining Urea Containing Protein Supplements by Scanning Electron Microscopy.

*Primary Examiner*—R. B. Penland
*Attorney, Agent, or Firm*—Schmidt, Johnson, Hovey & Williams

[57] ABSTRACT

A low cost, high capacity method for making starch-NPN liquid feed supplements is provided wherein a substantially NPN-free slurry containing water and a starch source is treated under high temperatures and pressures to gelatinize the starch component. After gelatinization, an NPN substance such as urea is added and thoroughly mixed with the slurry to produce a final feed. The cooking step may be advantageously performed indirectly using a tube and shell heat exchanger, or alternatively in a direct steam injection jet cooker. A wide variety of NPN substances can be employed in the supplements hereof, along with a large number of starch sources such as grains or industrial wastes. In addition, the liquid supplements can be modified either before or after processing by adding energy sources such as molasses thereto.

20 Claims, No Drawings

LIQUID STARCH-UREA RUMINANT FEED AND METHOD OF PREPARING SAME

BACKGROUND OF THE INVENTION

1. Field of the Invention

The present invention is broadly concerned with liquid feed supplements of the type which include a starch source and a nonprotein nitrogen (NPN) substance such as urea. More particularly, it is concerned with the method of making such NPN fortified supplements which requires a minimum of processing equipment, can accommodate a wide variety of differing processing techniques, and which yields final products having superior protein synthesis and growth-inducing properties.

2. Description of the Prior Art

It has long been known that NPN substances such as urea may be incorporated into feed for ruminants as a replacement for protein sources therein. When fed, the urea is first degraded by rumen microorganisms to ammonia, and a portion of the latter is then converted to microbial protein. A major portion of such microbial protein is then enzymatically degraded to amino acids in the small intestine of the ruminant, where, after being absorbed, they are available for use by the animal. Thus, NPN supplementation provides an economically attractive method of providing protein for the ruminant.

However, it has also long been known that NPN substances can be toxic to the ruminant if directly fed in more than relatively minimal amounts. Therefore, although direct feeding of NPN substances is a known practice, use of this technique is somewhat limited because of the inherent toxicity problems.

U.S. Pat. No. 3,642,489 describes chunk-type products which are produced through an extrusion process wherein a starch bearing food source such as corn and an NPN substance such as urea are admixed and run through a cooker-extruder to give a chunk-type product. Experience has proven that use of this type of process permits use of the NPN substance at levels which would be extremely toxic if simply mixed with a raw starch source and fed directly.

It is of significance that during experimentation in connection with extrusion produced products in accordance with U.S. Pat. No. 3,642,489, it was discovered that it was essential to add the NPN substance to the starch bearing material initially, whereupon this starch-NPN admixture was extruded. Attempts to add urea subsequent to the extrusion of an NPN-free starch source proved ineffective in giving an equivalent product.

Liquid starch-NPN food supplements are also known. For example, U.S. Pat. No. 3,988,483 described such a product which is produced using a jet cooker wherein a slurry comprising water, a starch bearing food substance, and an NPN source are admixed and run through a jet cooker for turbulent heating and gelatinization of the starch bearing material in the presence of the NPN source.

It is also known to prepare sprayable liquid feed supplements which include a minor amount of a starch source such as wheat or corn in conjunction with urea. For example, U.S. Pat. No. 3,684,518, describes a method wherein an aqueous slurry of wheat flour and urea liquor is prepared and simply heated at atmospheric pressure in order to provide a liquid product which is resistant to sedimentation. In addition, U.S. Pat. No. 3,653,909, describes a method wherein melamine and urea are admixed in aqueous suspension with wheat flour and heated under atmospheric pressure to achieve a uniform consistency. Other patents of background interest include: U.S. Pat. Nos. 3,968,253, 4,006,253, 4,016,296, 3,937,846, 3,852,498, 3,490,912, 3,635,725, 4,017,642, 4,044,156, 3,573,924, 3,165,413, 2,853,385, 2,748,001, 2,960,406, and 3,677,767.

SUMMARY OF THE INVENTION

The present invention is based upon the surprising discovery that, in producing liquid NPN-fortified starch-bearing ruminant feed supplements, NPN addition can, under certain circumstances, be effectively accomplished after cooking and gelatinization of the starch-bearing component. That is to say, the process of the present invention broadly includes the steps of preparing a substantially NPN-free aqueous slurry comprising water and a solids fraction which includes a quantity of an edible, substantially ungelatinized, starch-bearing feed material, whereupon the slurry is directed through a reaction zone and treated at elevated pressures and high temperatures for gelatinizing at least a portion of the starch-bearing feed material in the slurry. Subsequent to this treatment, the slurry can be fortified by a simple addition of an NPN source such as urea to yield a final feed product.

As noted above, experience with extrusion processed, chunk-type starch-NPN products indicated the necessity of initially admixing the starch source and urea, and simultaneously passing these components as an admixture through a cooker-extruder so that gelatinization of the starch material took place in the presence of the NPN substance. In sharp contrast to this prior experience, it has been found that liquid supplements can be prepared with subsequent (i.e., after the starch-bearing material has been cooked and gelatinized) addition of the NPN source. Direct comparative tests wherein urea was added prior to starch gelatinzation on the one hand, and subsequent to such gelatinization on the other hand, demonstrate that the resultant products are substantially equivalent.

In accordance with the invention, a number of alternatives can be employed for cooking and gelatinizing a substantially NPN-free slurry comprising water and a starch-bearing substance. For example, a heat exchanger of the tube and shell variety can be employed which includes a plurality of elongated, slurry-receiving conduits surrounded by a shell. In this mode of operation, the NPN-free slurry is directed through the conduits while a heat exchange media such as steam is directed into the exchanger shell. An indirect heating and gelatinization at elevated temperatures and pressures thereby results, giving a proper gelatinized substrate for subsequent NPN supplementation.

Alternately, a jet cooker can be employed which broadly involves directing a stream of steam into the cooker simultaneously with a stream of the NPN-free slurry so as to turbulently heat and gelatinize the starch-bearing feed material. Here again, the cooking is conducted at elevated temperatures and superatmospheric pressures, so as to give the proper treatment to the starch component. Jet cooker apparatus particularly suited for use in the present invention is fully illustrated and described in U.S. Pat. No. 3,988,483, and such patent is incorporated by reference herein. Basically, the jet cooker described in U.S. Pat. No. 3,988,483 involves directing a steam stream in one direction through the cooker while the slurry stream is directed obliquely but in the same general direction as the steam stream for intersecting and intermingling of the respective streams.

DESCRIPTION OF THE PREFERRED EMBODIMENTS

As indicated above, the first step in the preferred method of the invention involves preparing a substantially NPN-free aqueous slurry comprising water and a solids fraction which includes a quantity of an edible, substantially ungelatinized starch-bearing feed material. In practice, the slurry advantageously comprises from about 30 to 90 percent by weight free water (i.e., without taking into consideration the native water within the raw feed constituents), and correspondingly a solids fraction of from about 10 to 70 percent by weight. Most preferably, the slurry is from about 40 to 70 percent by weight free water, and from about 30 to 60 percent by weight solids.

An almost limitless number of starch-bearing materials can be employed to good effect in the present invention. For example, food sources selected from the group consisting of corn, sorghum, barley, oats, wheat, rice, millet, potatoes, yams, cassava, arrowroot, turnips, rutabagas, corn starch, potato starch, wheat starch, starch-bearing food and beverage (e.g., beer) processing waste liquors, and mixtures thereof have particular utility in the invention, although other specific starch sources may also be used. In addition, when grains such as corn or the like are used as the starch source, the same are preferably ground or micropulverized to an average particle size of less than about 500 microns, and preferably to an average size from about 75 to 250 microns. This comminution of the starch material facilitates proper gelatinization of the starch-bearing material.

During cooking operations using a jet cooker of the type described in U.S. Pat. No. 3,988,483, sufficient quantities of steam are fed to the cooker in order to maintain cooking temperature therewithin within the range of from about 215° F. to 388° F., and most preferably from about 285° F. to 315° F. This corresponds to a pressure within the jet cooker of from about 1 to 200 p.s.i.g., and preferably from about 38 to 70 p.s.i.g. In addition, sufficient moisture and thermal conditions are maintained during the cooking operation such that the starch-bearing food source passing through the cooker is from about 50 to 100 percent gelatinized, and most preferably from about 90 to 100 percent gelatinized. The residence time of the material in the jet cooker is estimated to be from about 5 to 60 seconds.

In the case of processing using the described heat exchanger or other indirect heating device, steam or other heat exchange media is fed to the exchanger shell, while the NPN-free slurry is directed through the exchanger tubes. This serves to indirectly heat and gelatinize the slurry without direct contact with the steam. In the case of indirect heating of this sort, the cooking temperatures (i.e., the temperature of the slurry in the tubes) should be within the range of from about 215° F. to 315° F., and more preferably from about 285° F. to 315° F. The pressure within the tubes should be above atmospheric and range from about 1 to 200 p.s.i.g., more preferably from about 38 to 70 p.s.i.g. The residence time of the slurry in the heat exchanger apparatus is estimated to range from about 5 to 60 seconds. Overall conditions within the exchanger should be maintained to give a slurry which is from about 50 to 100% gelatinized, more preferably from about 90 to 100% gelatinized.

Subsequent to gelatinization of the slurry by whatever method chosen, an NPN source is added, along with other optional ingredients if desired. Addition of the NPN source can be accomplished by simple mixing, but of course the NPN source should be thoroughly dispersed throughout the gelatinized slurry to assure product homogeneity.

An extremely wide variety of NPN substances can be employed in the present invention. For example, NPN sources such as urea, uric acid, biuret, ethylene urea, ammonia, ammonium salts, propionamide, butyramide, formamide, acetamide, dicyanodiamide, isobutanediurea, creatinine, urea phosphate, lactosyl urea, fermented ammoniated condensed whey, and creatine and mixtures thereof find particular utility in the invention. Specific ammonium salts advantageously used include members taken from the group consisting of ammonium phosphate, ammonium carbonate, ammonium bicarbonate, ammonium carbamate, ammonium citrate, ammonium formate, ammonium acetate, ammonium propionate, ammonium lactate, ammonium succinate, ammoninum fumarate, ammonium malate, ammonium chloride, ammonium sulfate, ammonium polyphosphate, diammonium phosphate and mixtures thereof. Urea is the most preferred NPN source, however, because of its relatively low cost and high nitrogen content.

In general the amount of NPN substance used in the present supplements will exceed to a greater or lesser degree the amount which could be tolerated by ruminants as to toxicity and palatability if simply mixed with a starch source and fed directly. It has been found that a ratio of starch source to nitrogen from the NPN substance is advantageously maintained within the range of from about 4:0.45 to 1:1.80, with the most preferred starch source-NPN nitrogen ratio ranging from about 2:0.45 to 1:0.90. In the case of the most preferred NPN source, urea, the starch source/NPN nitrogen ratio should range from about 4:1 to 1:4, most preferably from about 2:1 to 1:2. The amounts of preferred NPN sources needed to give supplements having the broad starch source/NPN nitrogen levels noted above are given in Table 1 of referenced U.S. Pat. No. 3,988,483, and this Table can be consulted for such information.

The protein equivalent levels given in the referenced Table demonstrate that this parameter can be varied over a wide range. In preferred forms the supplements hereof have P.E. levels of from about 15 to 150 percent and most preferably from about 30 to 70 percent, however.

It has been found that the feed products of the invention preferably should comprise from about 40 to 96 percent by weight water, and most preferably from about 40 to 70 percent by weight water. The water fraction for a given supplement may principally depend upon the type of starch source used; for example, with potato starch, it is generally found that higher solids contents are possible than with wheat or corn.

As indicated above, the products of the invention may be altered as to energy content and viscosity by a number of means. For example, a food source selected from the group consisting of molasses, hemicellulose extract of wood, lignin sulfonates, cheese whey, food and beverage processing waste liquors and mixtures thereof can be added to the feed product either prior to or subsequent to the heating and processing in order to enhance the total digestible nutrient (TDN) value thereof. Also, in some instances it is advantageous to add to the final feed product an acid taken from the group consisting of sulfuric, hydrochloric, phosphoric, propionic, acetic, sorbic, benzoic, butyric and formic acids and mixtures thereof. Propionic, acetic, butyric, sorbic and formic acids may serve principally as mold inhibitors for increasing the storability of the liquid supplement products, while the remaining aforementioned acids can be added as pH regulators and also as nutritive substances.

In preferred forms, the final feed product in commercial form has a viscosity within the range of from about 100 to 20,000 centipoise (cps). This viscosity alteration can be effected in a number of ways. For instance, in commercial forms enzyme (alpha-amylase) is added to reduce the viscosity. This addition advantageously should be made when the product is at a temperature of about 185° F. The amylase is allowed to act for a period of time to lower the viscosity of the supplement to a desired level, whereupon a small amount of acid such as phosphoric acid is added to the mixture in order to stop the action by the amylase. These steps in the process may also be accomplished by adding molasses or similar products to processed starch material and addition of the amylase to reduce viscosity of the final mix.

The final liquid feed supplement products are storable at room temperatures for relatively long periods of time, i.e., two months or more. Accordingly, few, if any, special precautions need be taken during storage.

The following examples will illustrate the production of liquid supplements in accordance with the invention, as well as certain comparative tests conducted to establish the desirability of the products. However, it is to be understood that the following examples are for purposes of illustration only and should not be taken as limitations upon the scope of the invention.

EXAMPLE I

Sixty percent protein liquid supplements were separately produced with a jet cooker and a heat exchanger for comparison purposes. The jet cooker was equipped with a Series "B" Hydroheater sold by Penick and Ford Ltd., Cedar Rapids, Iowa, and worked on the principle of applying pressurized steam (80 p.s.i.g.) directly to a slurry through the hydroheater, causing a high shear cook. The slurry was delivered to the jet cooker by use of a Moyno Pump (2J3 type CDQ, sold by Robbins and Meyers, Inc., Springfield, Ohio. During processing, steam condensed and reduced the final solids concentration by approximately 10 percent. This type of jet cooker apparatus is more fully described and explained in U.S. Pat. No. 3,988,483, and reference is made to this disclosure for further explanation of the jet cooker apparatus and the method of use thereof.

The heat exchanger was a shell and tube type apparatus. Slurry was delivered to the heat exchanger in the same manner as the jet cooker by use of the Moyno Pump. The slurry entered the exchanger through a 1.27 cm I.D. pipe. Once in the heat exchanger, the slurry passed through three separate copper tubes, each 6.35 mm I.D. and 64.77 cm long. Pressurized steam (80 p.s.i.g.) was injected into the exchanger shell but did not come into contact with the slurry within the tubes. The gelatinized starch-bearing material was then discharged through a 1.91 cm pipe.

The compositions used in the tests described herein are as follows:

TABLE 1

| Components (% by wt) | Jet Cooker Processed | Heat Exchanger Processed |
|---|---|---|
| Corn | 11.8 | 11.8 |
| Urea | 10.5 | 10.5 |
| Water | 20.6 | 26.6 |
| Water absorbed | 6.0 | — |
| Molasses | 49.1 | 49.1 |
| Phosphoric Acid | 1.5 | 1.5 |
| Propionic acid | 0.5 | 0.5 |
| TOTAL | 100.0 | 100.0 |

In the manufacture of the liquid supplements, yellow dent corn was finely ground through a Fitz Mill sold by The Fitzpatrick Company, Elmhurst, Illinois, using a 0.0508 mm screen. Water was added to the ground corn to form a slurry. Four methods of adding urea were studied as follows:

Treatments

1. Urea added before processing with the jet cooker. These samples are referred to as "JCB."
2. Urea added after processing while the gelatinized slurry was at a temperature of 70° C. and previously treated with alpha-amylase. These samples were processed using both the jet cooker and heat exchanger and are respectively referred to as "JCAH" and "HEAH."
3. Urea added one day after processing when the gelatinized slurry had cooled to 25° C. These samples are respectively identified as "JCAD" and "HEAD."
4. Urea added 7 days after processing when gel temperature was 25° C. These samples are respectively identified as "JCAW" and "HEAW."

Slurries processed through the jet cooker where urea was added before the heat treatment contained 52.4% moisture. Slurries processed where urea was added after processing contained 65.4% and 67.6% moisture for the jet cooker and heat exchanger processes, respectively. However, the moisture content of each of the final liquid supplements was adjusted to approximately 50%. This was done by adding water to the heat exchange supplements equal to the amount of steam condensed during the jet cooker process. Therefore, in vitro analyses could be performed on an equal moisture basis.

All slurries were processed at approximately 149° C. Alpha-amylase was added to the product at a rate of 0.25% (by weight) of the dry starch. Enzymatic activity was terminated after 14 minutes. A 10% enzyme solution was used. (A 15% saline solution was made by dissolving 15 g NaCl in 100 ml of distilled water. Ten ml of concentrated enzyme was added to 90 ml of saline solution.) Phosphoric acid (85% food grade) was used to terminate the enzymatic activity and propionic acid was added as an antimicrobial agent.

Analyses conducted on the treatments were crude protein by Kjeldahl (Nx6.25) (AOAC, 1975) dry matter content (oven drying for 1 hr. at 130° C.), and pH. Viscosities were determined by using a Synchro-Lectric Model LVT Viscometer (Brookfield Engineering Laboratories, Inc., Stoughton, Massachusetts). Values were reported in centipoise (CPS) units. Maltose equivalents (ME) (an estimation of starch damage) were determined and are reported as milligrams of maltose per gram dry matter. Microbial protein synthesis values were also determined.

Starch damage of the gels processed with the jet cooker or heat exchanger were compared from 3 processing runs, and these results are shown in Table 2.

TABLE 2

| Processing Technique | Observation | ME[1,2] |
|---|---|---|
| Jet Cooker | 1 | 336.3 |
| | 2 | 255.5 |
| | 3 | 299.4 |
| | Avg. | 297.1 |
| Heat Exchanger | 1 | 332.6 |
| | 2 | 273.1 |
| | 3 | 256.3 |
| | Avg. | 287.3 |

[1]Values expressed on dry matter basis (mg maltose per gram).
[2]Maltose equivalence values are not significantly different (P <.05).

The above results demonstrate that there are no significant differences (P<0.05) between the selected processing methods of jet cooking versus heat exchanger cooking. The moisture content of the slurries was sufficient to cause gelatinization with temperatures raised using direct or indirect steam applications.

Tests were also undertaken to determine if differences would be encountered in supplement performance (measured by maltose equivalent and protein synthesis) when urea was added at various stages of processing with direct or indirect heat application. These samples of the final products (32% crude protein) were drawn from the two types of processes and also from each of the urea addition intervals making a total of six treatments: 1. JCAH, 2. JCAD, 3. JCAW, 4. HEAH, 5. HEAD, 6. HEAW. Samples were analyzed for dry matter, crude protein, pH, viscosity, ME (using beta-amylase) and in vitro protein synthesized. These results are shown in Tables 3 and 4.

TABLE 3[1]

| Treatment[4] | Dry matter % | Crude protein % "as-is" | pH | ME[2] |
|---|---|---|---|---|
| JCAH | 52.25 | 33.31 | 4.4 | 274.6[3] |
| JCAD | 52.70 | 32.41 | 4.5 | 298.0 |
| JCAW | 50.61 | 22.58 | 4.2 | 333.7 |
| HEAH | 50.78 | 33.21 | 4.5 | 307.5 |
| HEAD | 51.17 | 32.64 | 4.5 | 308.6 |
| HEAW | 48.40 | 22.33 | 4.3 | 329.1 |

[1]Values are averages of three replications.
[2]Maltose equivalent (mg maltose/gm) values expressed on dry matter basis.
[3]Maltose equivalent values are not significantly different (P <.05).
[4]See earlier definition of these treatments.

TABLE 4

| Treatment[3] | Viscosity[1] 1st day | 7th day | Protein synthesized (mg. protein synthesized per gm. dry matter) |
|---|---|---|---|
| JCAH | 177 | 167 | 40.71[2] |
| JCAD | 147 | 133 | 40.59 |
| JCAW | 147 | 143 | 45.76 |
| HEAH | 130 | 126 | 40.97 |
| HEAD | 130 | 133 | 40.92 |
| HEAW | 140 | 133 | 42.51 |

[1]Values are averages of three replications reported in centipoise units.
[2]Values are averages of twelve observations and are not significantly different (P <.05).
[3]See earlier definition of these treatments.

In reviewing the above data, it should be noted that the crude protein of the supplements containing urea added one week after processing had consistently lower percentages regardless of processing method. The low protein values in these samples (JCAW and HEAW) are not fully understood, but it is believed that an error in urea addition may have occurred. Maltose Equivalents for all treatments were not significantly different (P<0.05). Viscosities (Table 4) of the liquid supplements were analyzed initially and at the end of one week. Results show only slight or no fluctuations in viscosities, within or between treatments.

Protein synthesis was conducted on three replications with four different rumen fluid sample collections, making a total of twelve observations per treatment. Protein synthesized (Table 4) between treatments were not significantly different (P<0.05). There was a trend toward higher values of protein synthesized for the samples where urea was added one week after heat processing the corn slurry (JCAW and HEAW). This may have been a result of increased energy availability per unit of urea. These samples were lower in protein, which was probably due to an error in urea addition.

Tests were conducted to determine if urea addition to the slurry before the jet cooker processing affected the performance (measured by protein synthesized) of the liquid supplement, compared to urea added after processing. Samples were drawn from the final products (32% crude protein) processed through the jet cooker with the addition of urea occurring before processing and with the addition of urea after processing when the temperature was 70° C., at 25° C. 1 day after processing, and at 25° C. 7 days after processing. Samples were analyzed for viscosity, dry matter, pH, crude protein, ME (method of ME incorporated the use of beta-amylase) and in vitro protein synthesized. These results are shown in Tables 5 and 6.

TABLE 5[1]

| Treatment[3] | Dry matter % | Crude protein % "as-is" | pH | ME |
|---|---|---|---|---|
| JCB | 51.21 | 31.52 | 4.3 | 288.1[2] |
| JCAH | 52.25 | 33.31 | 4.4 | 274.6 |
| JCAD | 52.70 | 32.41 | 4.5 | 298.0 |
| JCAW | 50.61 | 22.58 | 4.2 | 333.7 |

[1]Values are averages of three replications.
[2]Maltose equivalent values are not significantly different (P <.05).
[3]See earlier definition of these treatments.

TABLE 6

| Treatment[4] | Viscosity[1] 1st day | 7th day | Protein synthesized mg protein synthesized per gm dry matter |
|---|---|---|---|
| JCB | 397 | 410 | 38.99[2] |
| JCAH | 177 | 167 | 40.71[2,3] |
| JCAD | 147 | 133 | 40.59[2,3] |
| JCAW | 147 | 143 | 45.76[3] |

[1]Values are averages of three replications reported in centipoise units.
[2,3]Values are averages of twelve observations. Values with similar superscripts are not significantly different (P <.05).
[4]See earlier definition of these treatments.

Maltose equivalent averages ranged from a high of 333.7 mg maltose to a low of 274.6 mg maltose. However, these averages were not significantly different (P<0.05). The JCAW sample having the highest maltose equivalent may be partially due to an error in urea addition. Maltose equivalent values were reported on a dry matter basis, therefore the JCAW sample reports a higher maltose equivalent since it would contain more starch source per gram of dry matter.

Alpha-amylase was added to the liquid supplement at a rate of 0.25% of the starch source to lower the viscosities of the final products. Viscosity of the final products was determined initially and after one week of storage. Samples resulted in no change in viscosity within treatments. However, the average viscosity of the treatment (JCB) where urea was added before processing was more than twice that of the supplements having urea addition after processing. This difference may have been due to urea inhibiting the alpha-amylase activity in the JCB supplement. In the JCAH, JCAD and JCAW supplements, alpha-amylase was activated and terminated before any urea was added.

Protein synthesis was conducted (Table 6) on three sample replications with four different rumen fluid collection samples, making a total of twelve observations per treatment. Sample JCAW resulted in a significantly (P<0.05) higher level of protein synthesize than the JCB sample. This result was attributed to the higher energy-urea ratio of the JCAW sample. Samples with equal protein contents (JCB, JCAH, JCAD) were not significantly different (P<0.05) in mg of protein synthesized.

EXAMPLE II

In another test, the effect of urea addition before and after jet cooking was measured. Two jet-cooked products were tested, using identical processing conditions. In the production of product B, urea was added before jet-cooking the starch. In product A, urea was added after jet-cooking the starch. The composition of the A and B products is shown below:

TABLE 7

| Ingredient | % by wt. |
|---|---|
| Ground corn | 18.0 |
| Urea | 10.0 |
| Molasses | 12.5 |
| Phosphoric acid | 2.5 |
| Propionic acid | 0.5 |
| Water, plus .5% trace mineral mix, 100g vitamin A, 17g vitamin D. | 56.5 |
| | 100.0 |

Product B (urea added before processing) contained 29.3% crude protein and 33.1% dry matter. Product A (urea added after processing) contained 32.15% crude protein and 34.8% dry matter. The difference in the protein content of the two products probably was the result of loss in urea during processing.

Four rumen fistulated grade cows were used in a two by two, double reversal design to test the products A and B. The cows were divided into the two groups of two each on the basis of body weight. The cows were fed a ration of 5 lb. of prairie hay and 5 lb. of grain twice daily. During the 9 weeks of this study, the grain fed was:

1,969 lb. ground sorghum grain
20 lb. dicalcium phosphate
10 lb. trace mineralized salt
1 lb. vitamin A and D mix To attain an isonitrogenous feeding condition, 2.3 lb. of product A or 2.5 lb. of B were top dressed on the hay and grain. Feeding periods were three weeks in duration, with weekly sampling to determine rumen fill, total rumen dry matter, PEG (polyethylene glycol) assay, volatile fatty acid (VFA) concentration, bacterial protein concentration, bacterial amino acid composition, pH, $NH_3$-nitrogen content, and urea-N content. From these results, rumen fill rumen fermentation and nitrogen utilization were calculated.

On opening the rumen fistula, the hay mat was broken and the rumen contents mixed for three minutes. At 3, 6, and 12 hours a composite sample of rumen fluid was taken, filtered through two layers of cheese cloth, and placed in a 50 ml plastic centrifuge tube for PEG assay (baseline level). At 0, 3, 6, and 12 hours 100 g of PEG, dissolved in 400 ml of water were added, and the rumen contents mixed an additional three minutes. Two samples were taken for total dry matter, placed in Ez-foil meat pie tins and dried in a forced air oven 72 hours at 60° C.

Ten rumen fluid samples were composited, mixed, filtered through cheese cloth, and 250 ml was placed in a plastic centrifuge bottle which contained 7½ grains of $HgCl_2$, as a preservative. Samples were mixed well, the pH determined, and divided to provide samples for assay of PEG, VFA, Conway micro diffusion $NH_3$—N and urease-$NH_3$ (from which the urea-N was calculated). A portion of the sample was used to determine bacterial protein, and bacterial amino acids.

Product B appeared to increase rumen dry matter content slightly (Table 8). No difference was observed in rumen pH (Table 8).

Product B increased the total rumen bacterial protein production (Table 9). This difference was about 8% for Group 1 and about 12% for Group 2. There was no treatment effect on rumen ammonia-N, but utilization of urea was slightly greater for Product B (Table 9). Although differences were observed between the A and B products, they were not statistically significant based upon the number of animals tested.

TABLE 8

| Effect of Products A and B on Rumen Dry Matter and pH[1] | | | | | | |
|---|---|---|---|---|---|---|
| Sampling Time (hr) | Rumen dry matter (%) product | | | pH Product | | |
| | Group 1 | | | | | |
| | A | B | A | A | B | A |
| 0 | 10.7 | 11.5 | 11.27 | 5.50 | 5.95 | 6.20 |
| 3 | 11.3 | 11.8 | 11.9 | 5.65 | 5.95 | 6.05 |
| 6 | 12.4 | 11.8 | 11.4 | 5.50 | 5.95 | 6.10 |
| 12 | 10.4 | 11.4 | 11.0 | 5.45 | 5.95 | 6.20 |
| Avg. | 11.2 | 11.6 | 11.4 | 5.53 | 5.95 | 6.14 |
| | Group 2 | | | | | |
| | B | A | B | B | A | B |
| 0 | 12.3 | 12.6 | 13.1 | 5.25 | 5.70 | 5.95 |
| 3 | 13.5 | 13.2 | 13.7 | 5.40 | 5.90 | 6.10 |
| 6 | 14.3 | 13.0 | 13.4 | 5.25 | 5.85 | 6.00 |
| 12 | 12.5 | 12.3 | 22.8 | 5.25 | 5.80 | 6.15 |
| Avg. | 13.2 | 12.8 | 13.3 | 5.29 | 5.81 | 6.05 |

[1]None of the differences was statistically significant.

TABLE 9

| Effect of Products A and B on urea utilization and bacterial protein synthesis[1] | | | | | | | | | | |
|---|---|---|---|---|---|---|---|---|---|---|
| Sampling time (hr) | $NH_3$-N(mg/100 ml) Product | | | Urea-N(mg/100 ml) Product | | | Bacterial protein conc. (mg/100 ml) Product | | | Total bacterial production (g) Product | | |
| | A | B | A | A | B | A | A | B | A | A | B | A |
| | Group I | | | | | | | | | | | |

TABLE 9-continued

Effect of Products A and B on urea utilization and bacterial protein synthesis[1]

| | | | | | | | | | | | |
|---|---|---|---|---|---|---|---|---|---|---|---|
| 0 | 3.9 | 9.5 | 11.7 | 1.40 | .85 | 1.75 | 35.0 | 35.6 | 38.8 | 14.4 | 18.1 | 16.6 |
| 3 | 32.9 | 39.0 | 47.7 | 3.50 | .90 | 2.55 | 42.2 | 37.2 | 26.9 | 23.8 | 19.4 | 23.8 |
| 6 | 20.0 | 31.0 | 32.8 | 3.60 | .35 | .60 | 38.8 | 40.3 | 37.2 | 25.9 | 37.5 | 24.1 |
| 12 | 4.6 | 19.7 | 18.9 | 1.85 | .90 | .80 | 40.6 | 39.1 | 36.3 | 28.8 | 25.3 | 27.2 |
| Avg. | 15.3 | 24.8 | 27.8 | 2.59 | .75 | 1.43 | 39.1 | 38.1 | 37.3 | 23.2 | 25.1 | 22.9 |

| | | | | | Group II | | | | | | |
|---|---|---|---|---|---|---|---|---|---|---|---|
| | B | A | B | B | A | B | B | A | B | B | A | B |
| 0 | 4.7 | 11.5 | 16.1 | 1.65 | 1.30 | 1.30 | 53.4 | 52.9 | 59.1 | 25.9 | 28.1 | 37.2 |
| 3 | 35.1 | 49.4 | 52.8 | 2.30 | .85 | 2.65 | 57.2 | 57.8 | 56.9 | 23.1 | 31.3 | 39.7 |
| 6 | 25.2 | 37.3 | 34.2 | 1.70 | 2.20 | .05 | 49.1 | 57.5 | 58.1 | 43.1 | 38.8 | 50.9 |
| 12 | 9.2 | 31.1 | 26.6 | 1.45 | .85 | .85 | 47.5 | 55.0 | 53.8 | 43.4 | 38.4 | 40.6 |
| Avg. | 18.5 | 32.3 | 32.4 | 1.78 | 1.30 | 1.21 | 51.8 | 55.6 | 57.1 | 33.8 | 34.1 | 42.1 |

[1]None of the differences was statistically significant.

Having thus described the invention, what is claimed as new and desired to be secured by Letters Patent is:

1. A method of preparing a liquid starch-NPN ruminant feed supplement comprising the steps of:
    preparing a substantially NPN-free aqueous slurry comprising water and a solids fraction which includes a quantity of an edible, substantially ungelatinized starch-bearing feed material,
    said slurry comprising from about 30% to 90% by weight free water, and correspondingly a solids fraction of from about 10% to 70% by weight;
    directing a stream of said slurry to a reaction zone;
    subjecting said slurry to elevated pressures ranging from about 1 to 200 psig and to heating to a temperature of from about 215° to 388° F. in said zone for gelatinizing from about 50 to 100% of said starch-bearing feed material in said slurry;
    passing said slurry out of said treatment zone while the slurry remains substantially NPN-free; and
    adding a quantity of an NPN source to said slurry to yield a feed product,
    the ratio of starch-bearing feed material to nitrogen from said NPN source ranging from about 4:0.45 to 1:1.80.

2. The method of claim 1 wherein said slurry comprises from about 40% to 70% by weight free water, and correspondingly a solids fraction of from about 30% to 60% by weight.

3. The method of claim 1 wherein said ratio ranges from about 2:0.45 to 1:0.90.

4. The method of claim 1 wherein said starch-bearing feed material is selected from the group consisting of corn, sorghum, barley, oats, wheat, rice, millet, potatoes, yams, cassava, arrowroot, turnips, rutabagas, corn starch, potato starch, wheat starch, starch-bearing food and beverage processing waste liquors, and mixtures thereof.

5. The method of claim 1 wherein said nonprotein nitrogenous substance is selected from the group consisting of urea, uric acid, biuret, ethylene urea, ammonia, ammonium salts, propionamide, butyramide, formamide, acetamide, dicyanodiamide, isobutane diurea, creatinine, creatine, lactosyl urea, urea phosphate, and fermented ammoniated condensed whey, and mixtures thereof.

6. The method of claim 5 wherein said ammonium salts are selected from the group consisting of ammonium phosphate, ammonium carbonate, ammonium bicarbonate, ammonium carbamate, ammonium citrate, ammonium formate, ammonium acetate, ammonium propionate, ammonium lactate, ammonium succinate, ammonium fumarate, ammonium malate, ammonium chloride, ammonium sulfate, diammonium phosphate, ammonium polyphosphate and mixtures thereof.

7. The method of claim 5 wherein said nonprotein nitrogeneous substance is urea.

8. The method of claim 1 wherein said starch-bearing feed material is a grain ground to an average size of less than about 500 microns.

9. The method of claim 8 wherein said starch-bearing feed material is ground to an average size of from about 75 to 250 microns.

10. The method of claim 1 wherein said starch-bearing food source is from about 90% to 100% gelatinized during passage thereof through said zone.

11. The method of claim 1 wherein said pressure ranges from about 38 to 70 p.s.i.g.

12. The method of claim 1 wherein said feed product has a protein equivalent of from about 15% to 150%.

13. The method of claim 12 wherein said protein equivalent is from about 30% to 70%.

14. The method of claim 1, wherein said feed product comprises from 40% to 96% by weight water.

15. The method of claim 14 wherein said feed product comprises from about 40% to 70% by weight water.

16. The method as set forth in claim 1 wherein said zone includes a jet cooker, said heating step being accomplished by directing a stream of steam directly into said slurry as said slurry passes through said zone for turbulently heating and gelatinizing said feed material.

17. The method of claim 16 wherein said temperature is from about 285° F. to 315° F.

18. The method of claim 16 wherein said steam stream is directed in one direction through said zone of turbulence, and said slurry stream is directed obliquely but in the same general direction as said steam stream in said zone for direct intersecting contact and intermingling of the respective streams.

19. The method of claim 1 wherein said zone includes a heat exchanger having at least one slurry-receiving conduit and a heat exchange media space adjacent said conduit, said heating step being accomplished by directing a hot heat exchange media into said space and simultaneously directing said slurry through said conduit for indirect heating and gelatinization of said feed material.

20. The method of claim 19 wherein a plurality of slurry-receiving conduits are provided, said media space being defined by a shell surrounding said conduits.

* * * * *